Figure 1:
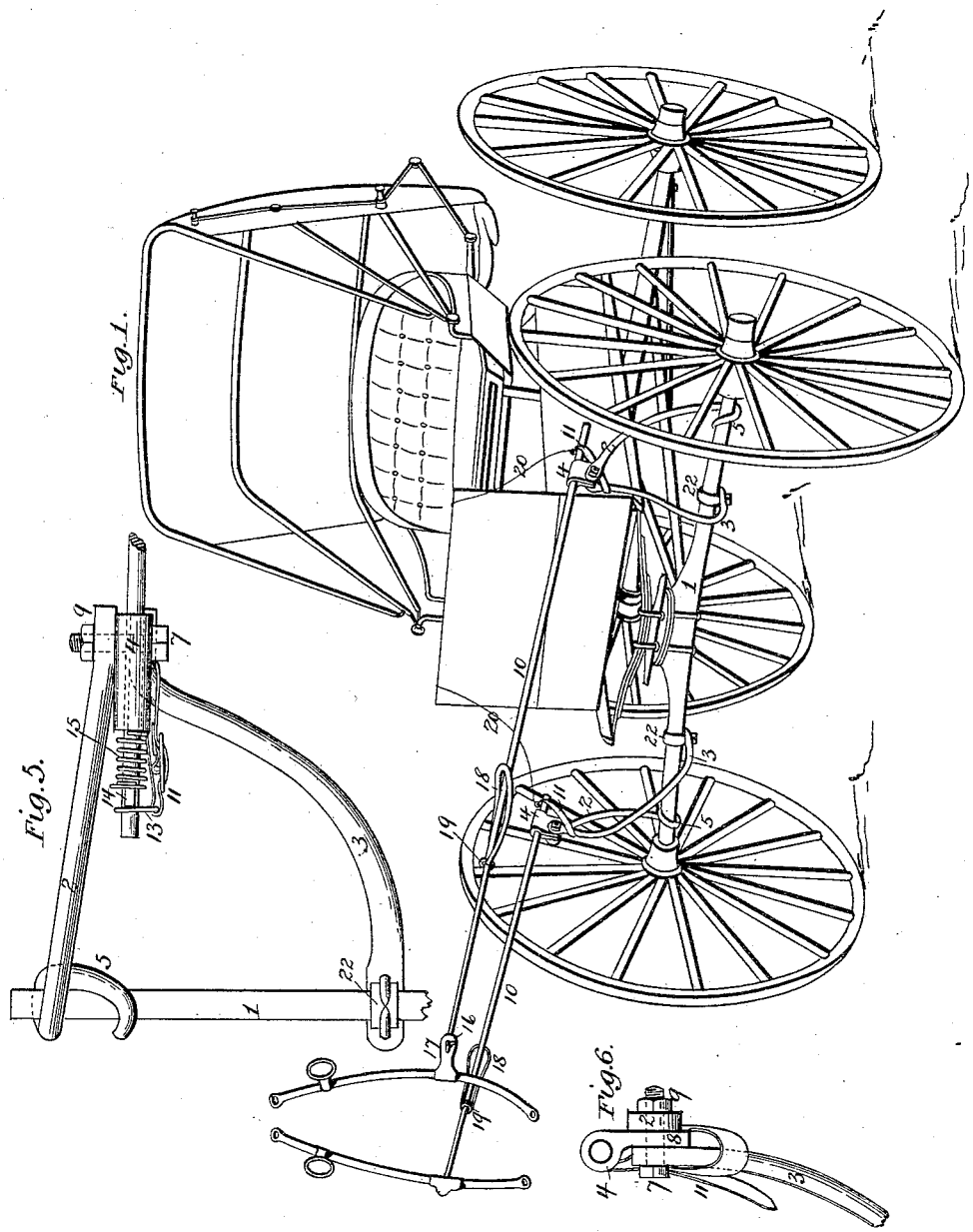

(No Model.)　　　　　　　　　　　　　　　　　　　2 Sheets—Sheet 1.
A. G. JOHNSON.
VEHICLE SHAFTS.

No. 429,810.　　　　　　　　　　　Patented June 10, 1890.

Witnesses　　　　　　　　　　　　　　　　　Inventor.

(No Model.) 2 Sheets—Sheet 2.
A. G. JOHNSON.
VEHICLE SHAFTS.
No. 429,810. Patented June 10, 1890.
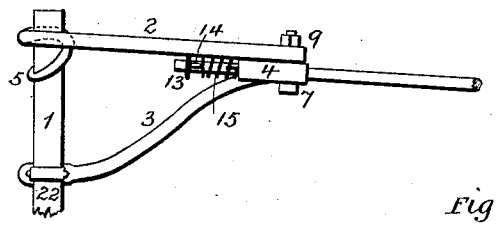
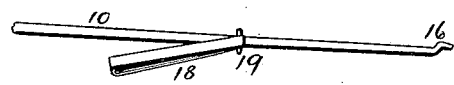
Fig. 2.
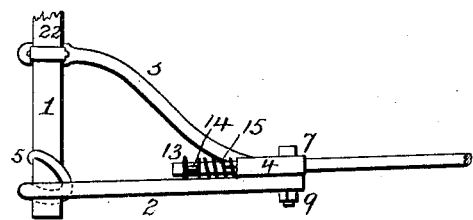
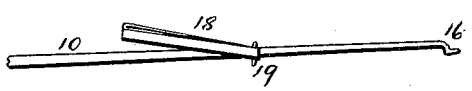
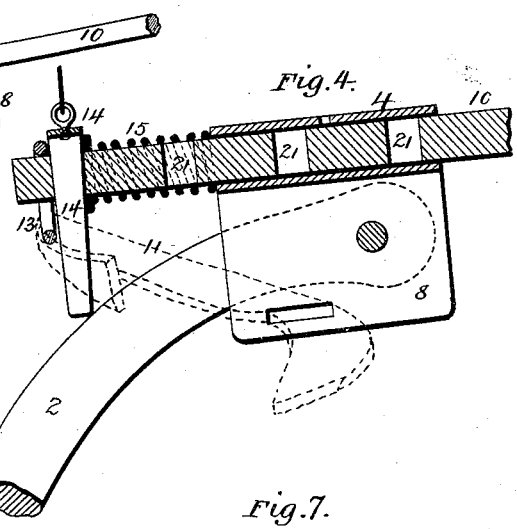
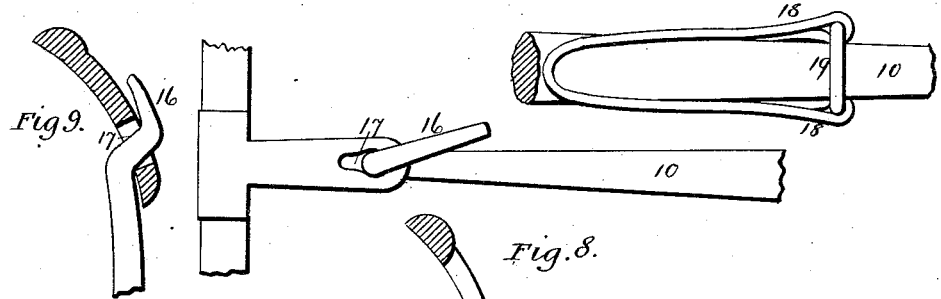
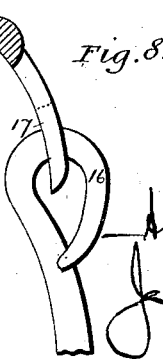
Witnesses:
Will T. Norton
Howell Bartle
Inventor:
Allen George Johnson
by Johnson and Johnson
his Attorneys.

UNITED STATES PATENT OFFICE.

ALLEN GEORGE JOHNSON, OF BOSTON, GEORGIA, ASSIGNOR OF ONE-HALF TO A. G. STEELE, OF SAME PLACE.

VEHICLE-SHAFT.

SPECIFICATION forming part of Letters Patent No. 429,810, dated June 10, 1890.

Application filed March 11, 1890. Serial No. 343,492. (No model.)

*To all whom it may concern:*

Be it known that I, ALLEN GEORGE JOHNSON, a citizen of the United States, residing at Boston, in the county of Thomas and State of Georgia, have invented new and useful Improvements in Vehicle-Shafts, of which the following is a specification.

My invention is directed to a novel construction and arrangement of shafts or thills for vehicles, whereby the harness-hames are attached directly thereto and the use of traces dispensed with.

My invention provides for the employment of independently-movable shafts or thills adapted to be directly engaged with the hames of the horse's collar, and thereby to serve the purpose of the traces in pulling the vehicle; it provides such a construction of shafts whereby they are adapted to pull the vehicle with a sliding, yielding, or cushioned connection with braces of the front axle; it provides such a construction of shafts whereby they are adapted for independent lengthwise movement within certain limits, both in pulling and in backing the vehicle; it provides such a construction of shafts whereby they are mounted independently within pivoted bearing-sleeves, within and upon which they are adapted to have a sliding lengthwise movement and a rising and falling movement with the horse; it provides such a construction of shafts whereby they may be raised perpendicularly and supported out of the way, or moved horizontally back under the body of the vehicle in housing the latter, and it provides such a construction of shafts whereby they are connected to the front axle in a manner to distribute the draft equally from the upper and under sides of the axle and thereby prevent all strain which would tend to twist or bend the axle king-bolt. These and other matters of novel construction and of combination are embraced in my invention, and which I will describe in connection with the accompanying drawings, which illustrate my invention and the manner of using it, and wherein—

Figure 1 represents in perspective a buggy having my improved shafts or thills. Fig. 2 shows the shafts or thills and their connection with the front axle in top view. Fig. 3 shows in perspective the pivotal and the yielding connections of one of the shafts with its axle-braces. Fig. 4 is a vertical longitudinal section of the same. Fig. 5 is a top view of the same, and Fig. 6 is an end view of the pivotal bearing-sleeve for the shaft. Fig. 7 shows the manner of attaching the breeching holdback-straps to the shafts. Fig. 8 shows the manner of attaching the shafts to the eyes of the hames, and Fig. 9 shows a modification of such attachment.

As a means of applying the independently-movable and yielding shafts to the vehicle I provide suitable brace-supports and bearing-sleeves attached to and projecting frontward from each end of the axle 1. I prefer the construction shown, which consists of a pair of braces 2 3, rigidly secured to the axle and having a bearing-sleeve 4 pivoted to their front ends, so as to stand in line with the shaft and form a support for its inner end. These braces extend forward and upward from the axle a suitable distance, and are firmly secured or clipped to the axle, so that the outside brace 2 extends from the upper side of the axle and the inner brace 3 extends from the under side of the axle, for a purpose as I shall presently state. The usual clip-fastenings may be employed for these braces; but I prefer to fasten the outside brace by spirally twisting its end around the axle and binding it thereto by a twisted arm 5.

Between the forward ends of the braces is secured the sleeve-bearing 4 by means of a bolt 7, passed through holes in the ends of the braces and through a hole in a plate 8, secured to and depending from the said sleeve-bearing and secured by a nut 9, so that the said sleeve-bearing is free to turn upon said bolt between the ends of the braces. The shaft or thill 10 is fitted to slide in and through this pivoted sleeve-bearing, and its inner or rear end is connected to one of the braces, preferably the inner one, by means of a strap 11, suitably secured to the rear end of the shaft and passed around the end of the brace, for the purpose of limiting the rearward-sliding movement of the shaft within the sleeve-bearing.

To prevent the wearing or cutting of the strap at its brace-connection, the strap may be passed through a slot 12 in the plate of the sleeve-bearing, as in Figs. 3 and 4, and the outer side of the sleeve-plate may have a shield over its slot, which may be formed in a sunken part of the plate to protect the strap from wear by the outer brace and the rocking action of the sleeve-bearing under the motion of the horse. I prefer to connect the strap to the shaft by means of a ring 13, hung upon the end of the shaft, so as to bear against a key 14, fitted into a hole in the shaft, for a purpose to be presently stated.

I provide for cushioning the draft of the shafts upon the sleeve-bearings by means of a coiled spring 15, placed upon the inner end of each shaft between the inner end of the sleeve-bearing and the key 14, fitted into said shaft, so that the force of the spring is constantly exerted against the sleeve to pull the shaft back in it, and thereby forms a yielding draft for the horse, which is especially advantageous in giving a comparatively easy draft and turning movement to the horse.

The forward ends of the shafts or thills are adapted to be secured directly to the hames by being formed with hook 16, twisted and adapted to be passed into and through the eyes 17 of the hames heretofore used for attaching the draft-traces. The form of the hook must be such as to make a secure and safe lock-fastening to the hames and at the same time permit of its easy and quick engagement with and disengagement from the eye of the hames, and for this purpose it may be in the coiled or twisted form shown in Fig. 8 or in the bayonet form shown in Fig. 9.

The holdback-straps 18, which are attached to the breeching of the harness, are provided with a ring 19, large enough to be easily passed over the hooked end of the shaft and to be supported against a shoulder thereon or by the tapering form of the shaft, upon which they will be firmly jammed when slid backward thereon in the holding-back action of the horse, as in Fig. 7. While the rings are thus firmly bound upon the shafts by the tapering form of the latter, yet these rings may be readily slid forward to remove them by doubling the ends of the holdback-straps over the ring, so that they form the bearings upon the shaft and the more easily allow the ring to be slid off.

I have stated that the axle-braces bear a certain relation thereto, so that they support the pivoted sleeve-bearings for the shafts above the front axle, and the line of draft, therefore, would tend to turn the axle over both in pulling and in backing and thereby tend to bend or twist the king-bolt, and it is to prevent this that I have arranged the braces as described, one above and one below the axle, to equalize the draft thereon both in pulling and in backing. This construction and arrangement of the braces and their relation to the pivoted sleeve-bearings for supporting the shafts and the straps for connecting the latter to the braces give the advantage of permitting the shafts to be turned up and supported in upright positions slightly inclined toward the vehicle and held in such position by means of said straps, for when the shafts are so turned up their inner ends will stand down under the sleeve-bearings, carrying the straps with them and reversing their position, so that they will pull forward instead of backward upon the braces, and thus hold the shafts in the positions stated out of the way. This construction also renders it easy to put the horse in position to bring the shafts down over him and to fasten them to the hames.

I have stated that the strap which connects the inner brace with the shaft is hung upon the rear end of the latter by a ring, and it will be understood that such ring-connection, by withdrawing the key, allows the shaft to be slid back through its sleeve-bearing under the body of the vehicle out of the way without removing the strap or the spring from the shaft, so that when the latter is again drawn forward to its operating place in its pivoted sleeve-bearing the key is again put in place as a stop for the strap to act against in backing the vehicle. The capacity of the shafts to yield endwise independent of their connection with the braces allows one shaft to be pulled forward and the other to be pushed backward in their sleeve-bearings in turning the vehicle, in which the pulling of one shaft is against the spring-cushion, while the pushing of the other shaft is against the strap which connects it with the brace. The straps serve another important advantage in holding the shafts firm and preventing them from moving up or down when backing the vehicle, because in such action the straps are drawn tight around the inner braces, and thus act to stiffen the joints by reason of the downward pulling action of the straps, their connection with the rigid braces, and the connection of the shafts with the hames. This construction and arrangement of the shaft allows one to be raised independent of the other to put in the horse or for other purpose, and allows one or both to be removed at pleasure by withdrawing the keys which lock them to the sleeve-bearings. This provision of removable keys or pins for locking the shafts to their pivoted sleeve-bearings gives the advantage of allowing the shafts to be detached from the vehicle by placing the keys or pins under the control of the driver by means of cords 20, connected to the upper ends of the keys, so that he can withdraw both at once in case of accident or the running away of the horse.

Referring to Fig. 4, the holes 21 seen in the shafts are to provide for the adjustment of the keys to adjust the shafts or thills to suit the length of the horse, so as to bring it at the proper distance from the front axle. I also provide for adjusting the distance between the inner ends of the shafts by making the inner braces adjustable upon the axle by means of the clips 22, so that the inner braces may be set nearer to or farther from the outer fixed braces to suit the width of the horse.

In hitching the horse it is only necessary to secure the forward ends of the shafts in the eyes of the hames and the holdback-straps to the breeching and the draft will be directly from the collar upon the shafts, the draft upon the latter will be equalized and cushioned, and the shafts will be free to rise and fall with the movements of the horse.

No special harness is needed for use with my improved shafts or thills, with which the usual tugs and traces are dispensed with. There is nothing in the connections of the parts which will produce rattling that cannot be easily prevented by the use of leather washers placed at the desired points.

While I have described and shown the shafts as being cushioned within sleeve-bearings pivoted to the forward ends of braces extending from the upper and the lower sides of the axle, and wherein the shafts are provided with means whereby they are rigidly attached to the hames, yet it is obvious that the shafts may be used with such braces without being cushioned, and that they may also be used with the usual harness-connections with the advantages due to the improved draft upon the axle.

I claim as my invention—

1. The combination, with the front axle of a vehicle, of braces connected in pairs to the ends of said axle, one brace 2 of each pair extending frontward from the upper side of said axle and the other brace 3 of each pair extending frontward from the under side of said axle, and shafts or thills pivotally connected to the front ends of said braces for movement in a vertical direction upon said pivot, substantially as described.

2. In combination with the front axle of a vehicle, two outer braces 2, rigidly secured to the front axle and curved forward from the upper side of the same, two inner braces 3, adjustably secured to the said axle and curved forward from the under side of the same, and shafts or thills pivotally connected to the front ends of said braces for movement in a vertical direction upon said pivot, substantially as described.

3. In combination with the front axle of a vehicle, two outer braces having their ends bound around the axle by terminal coils and curved forward and upward from the upper side of the axle, two inner braces adjustably clipped to said axle and projecting forward and upward from the under side thereof, and the shafts or thills pivotally secured between the ends of said braces, substantially as described.

4. In combination with the front axle of a vehicle, two pairs of braces 2 and 3, secured to said axle, a sleeve-bearing 4, pivoted to rock in a vertical direction between the front ends of each pair of braces, the shafts rigidly attached to the harness-hames and having their rear ends passing through said pivoted sleeve-bearings, spring-bearings for limiting the forward movement of said shafts within said sleeves, and strap-connections for limiting the rearward movement of said shafts within said sleeves, as set forth.

5. In combination with the front axle of a vehicle, two pairs of braces secured to said axle, a sleeve-bearing pivoted to rock in a vertical plane between the front ends of each pair of braces, shafts or thills provided with means for rigidly attaching their forward ends to the harness-hames and having their rear ends passing through said pivoted sleeve-bearings, a key or pin in the end of each shaft to limit the forward movement of the latter within said sleeve-bearing, and a strap arranged to connect the inner end of each shaft to the braces, whereby to limit the rearward movement of the shafts within said sleeve-bearings, as set forth.

6. The combination of the sleeve-bearings pivotally supported from the front axle of a vehicle to rock in a vertical plane, shafts or thills having their rear ends passing through said sleeve-bearings and having suitable means for attaching their forward ends to the harness-hames, and means connected with the shafts and with the supports for the sleeve-bearings for adjusting the connection of the shafts with said sleeve-bearings and for limiting their forward and rearward movements within the same, consisting of the holes in the shafts, the adjustable key 14, and the strap 11, substantially as described, for the purpose specified.

7. In combination with the front axle of a vehicle, two pairs of braces secured to said axle, one fixed and the other laterally adjustable in relation to the fixed one, a sleeve-bearing pivoted to rock in a vertical plane between the front ends of said braces, shafts or thills having their front ends provided with means for rigidly attaching them to the harness-hames and having their rear ends passing through said pivoted sleeve-bearings, a flexible stop 11 to limit the rearward movement of said shaft, and a key 14, adjustable with openings 21 in said shaft, whereby the shafts are made adjustable to suit the width and the length of the horse, substantially as described.

8. The combination of the sleeve-bearings pivotally supported from the front axle of a vehicle to rock in a vertical plane, shafts or thills having means for rigidly attaching their front ends to the harness-hames, sliding with their rear ends in said sleeve-bearings, and having stops to limit their forward and rearward movements within the same, and springs 15 upon the said shafts, arranged to cushion their draft upon said bearings, substantially as described.

9. In combination, the axle-braces 2 and 3, the sleeve-bearings 4, pivoted to said braces for movement in vertical directions, the shafts passing through said sleeves and rigidly attached to the harness-hames, the keys 14 in the ends of said shafts, the spring 15, arranged on the ends of said shafts against said sleeve-bearings to cushion the drafts of the shafts, and straps secured to said braces and to said shafts, substantially as described, for the purpose specified.

10. The combination, with the front axle of a vehicle, the sleeve-bearings pivotally supported from said axle to rock in vertical planes, the shafts adapted to slide within said sleeve-bearings and provided with hooks at their front ends, cushioned stops to limit the forward movement of the shafts, and straps arranged and connected to the fixed and the moving parts to limit the rearward movement of the shafts, substantially as described.

11. The shafts of a vehicle tapering toward their front ends and terminating with hooks, whereby they are rigidly fastened to the harness-hames, their rear end fitted to slide in sleeve-bearings pivotally supported from the front axle and provided with holdback-straps having rings fitted to slide upon said shafts, in combination with said sleeve-bearings, a cushioned draft-stop for said shafts, and a flexible rear stop for said shafts, substantially as described, for the purpose specified.

12. The shafts of a vehicle having their front ends provided with hooks adapted to form rigid engagement with the harness-hames fitted to slide lengthwise in sleeve-bearings, at their inner ends pivoted to rock in vertical planes, and having a cushioned draft upon said pivoted sleeve-bearings, substantially as described.

In testimony whereof I have hereunto set my hand in the presence of two subscribing witnesses.

ALLEN GEORGE JOHNSON.

Witnesses:
T. T. STEPHENS,
W. D. BRASNELL.